United States Patent
Tsukahara (10) Patent No.: US 7,088,555 B2
(45) Date of Patent: Aug. 8, 2006

(54) RAMP FOR HARD DISC

(75) Inventor: Hiroshi Tsukahara, Kurashiki (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 10/497,701

(22) PCT Filed: Dec. 9, 2002

(86) PCT No.: PCT/JP02/12858

§ 371 (c)(1),
(2), (4) Date: Jun. 4, 2004

(87) PCT Pub. No.: WO03/050186

PCT Pub. Date: Jun. 19, 2003

(65) Prior Publication Data

US 2005/0018353 A1 Jan. 27, 2005

(30) Foreign Application Priority Data

Dec. 12, 2001 (JP) ............................ 2001-378948

(51) Int. Cl.
*G11B 5/54* (2006.01)
(52) U.S. Cl. ................................................. 360/254.8
(58) Field of Classification Search ...................... None
See application file for complete search history.

(56) References Cited

U.S. PATENT DOCUMENTS

| | | | |
|---|---|---|---|
| 3,574,786 A * | 4/1971 | Ishida et al. | 524/91 |
| 6,151,190 A | 11/2000 | Yamamoto et al. | |
| 6,156,834 A * | 12/2000 | Seyama et al. | 524/321 |
| 6,160,686 A | 12/2000 | Albrecht et al. | |
| 6,181,528 B1 | 1/2001 | Reinhart et al. | |
| 6,487,051 B1 * | 11/2002 | Koyanagi et al. | 360/254.8 |
| 2001/0040769 A1 * | 11/2001 | Takami | 360/254.7 |
| 2003/0214757 A1 * | 11/2003 | Tokura et al. | 360/254.7 |

FOREIGN PATENT DOCUMENTS

| | | |
|---|---|---|
| EP | 0 424 170 A2 | 4/1991 |
| JP | 3-134050 A | 6/1991 |
| JP | 5-156118 A | 6/1993 |
| JP | 8-157688 A | 6/1996 |
| JP | 10-125014 A | 5/1998 |
| JP | 10-302421 A | 11/1998 |
| JP | 10-312657 A | 11/1998 |
| JP | 11-339411 A | 12/1999 |
| JP | 2001-23325 A | 1/2001 |
| JP | 2001-195853 A | 7/2001 |

(Continued)

OTHER PUBLICATIONS

D.M. Marsh, Proceedings of The Royal Society, series A Mathematical and Physical Sciences, 1378 (279), 1964, London pp. 420 to 435.

(Continued)

*Primary Examiner*—Wayne Young
*Assistant Examiner*—Linh T. Nguyen
(74) *Attorney, Agent, or Firm*—Birch, Stewart, Kolasch & Birch, LLP (57) ABSTRACT

A ramp having a surface hardness of 2.6 GPa or more, which is obtained by molding a polyacetal resin. Such a ramp made of a polyacetal resin is excellent in moldabilities, and an abrasion loss at the resin portion of the ramp is remarkably small when a hard disk is operated. Thus it is suitable as a ramp for housing and guiding a head within a hard disk drive.

16 Claims, 1 Drawing Sheet

LOCATION OF SURFACE HARDNESS MEASUREMENT

FOREIGN PATENT DOCUMENTS

| | | |
|---|---|---|
| JP | 2001-229634 A | 8/2001 |
| JP | 2001-297548 A | 10/2001 |
| JP | 2002-124051 A | 4/2002 |
| JP | 2002-197820 A | 7/2002 |
| WO | WO 97-39459 A1 | 10/1997 |

OTHER PUBLICATIONS

D.M. Marsh, Proceedings of The Royal Society, series A Mathematical and Physical Sciences, 1388 (282), 1964, London pp. 33 to 43.

Edited by Asahi Kasei Amidasu Kabushiki Kaisha, 'Plastics' Henshubu, "Plastic Data Book", first edition, Kogyo Chosakai Publishing Co., Ltd. (1999), pp. 581 to 584.

"Koshitsu Hakumaku no Nano-indentation Hyoka Gijutsu", Gekkan Tribology, Yugen Kaisha Shinjusha, Sep. 2002. pp. 19 to 21.

"Hakumaku no Kikaiteki Tokusei no Hyokaho Kodo ya Tai Mamosei nado o Kaimei", Nikkei Mechanical, No. 275 (1988), Nikkei Magurouhiru-Sha, pp. 95 to 96.

\* cited by examiner

FIG. 1

LOCATION OF SURFACE HARDNESS MEASUREMENT

FIG. 2

RAMP FOR HARD DISC

TECHNICAL FIELD

The present invention relates to a ramp for housing and guiding a head within a hard disk drive, which is formed with a polyacetal resin.

BACKGROUND ART

Conventionally, the mainstream of a position at which a head within a hard disk drive is put on standby has been the upper part of the inner radius of a magnetic disk (CSS system). This system has a problem as described hereinafter.

That is, in order to improve the magnetic recording density of a hard disk, it has recently been required to make the flying height of a head lower so as to decrease the gap size between the head and the disk. In order to satisfy such requirements, it is necessary to improve the surface smoothness of each of the head slider and the disk. However, there has existed the problem that when such smooth surfaces come into contact with each other, an adsorption phenomenon occurred, whereby the head was not operative. Particularly in the CSS system, this problem has occurred with a high probability. Furthermore, there has existed the problem that according to the CSS system, in a disk area wherein a head was put on standby, the surface of the area became coarse, and thus such a disk area could not be recorded, whereby the recording capacity was inevitably decreased. Additionally, according to the CSS system, when a hard disk unit was impacted, the collision of a head and a disk was caused with a high probability, whereby the disk and data tended to be damaged.

In order to solve such problems of a CSS system so as to enhance reliability, recently the CSS system tends to be shifted to a Load/Unload system wherein a component part referred to as a ramp is provided on the outside of a disk in order to house and guide a head within a hard disk drive. In most hard disks as used, in particular for a notebook computer, a car navigation system or a mobile application, a Load/Unload system is employed.

A polyacetal resin is excellent in balance between mechanical strength, chemical resistance and sliding properties, and in working properties, and thus is broadly used as a typical engineering plastic, and mainly for electrical machinery and mechanism components thereof, and automobile components. Furthermore, the extension of its utilized field in recent years has been accompanied with the extensive utilization of various mechanism components. As an example thereof, a ramp within a hard disk drive can be cited.

For example, JP-11-339411A discloses a copolyester of 4-hydroxybenzoic acid and 6-hydroxy-2-naphthoic acid (HAHN), polyacetal, or polyether ether ketone as a ramp material. Furthermore, JP-2001-23325A discloses polyimide, polyacetal, PEEK, HAHN, a liquid crystal polymer, and a PTFE-filled plastic as a ramp-unit material. Besides, JP-10-125014A discloses a synthetic resin such as polyacetal as a ramp material. Furthermore, JP-10-312657A discloses a ramp whose supporting section is formed with a thermoplastic polyimide, whose sliding section is formed with a polytetrafluoroethylene-contained liquid-crystal polymer. Besides, JP-10-302421A discloses that a dry lubricating film (of a tetrafluoroethylene resin, an imide resin, or the like) is formed on the contact area (or sliding surface) of a ramp. Furthermore, each of JP-2002-124051A; 2001-229634A; and 2001-195853A discloses that a polymeric material having a low coefficient of friction, or a resin material having excellent frictional wear properties is applied to the guide area (or sliding portion) of a ramp.

A method using for a ramp a copolyester of 4-hydroxybenzoic acid and 6-hydroxy-2-naphthoic acid (HAHN), polyether ether ketone, polyimide, a liquid crystal polymer, a PTFE-filled plastic, or a polytetrafluoroethylene-contained liquid crystal polymer, as employed in the prior art, had the problem that an abrasion loss at the resin portion of the ramp was remarkably large, said abrasion loss being generated when a hard disk was operated, whereby a metallic tab used as a mating material was scraped therewith. Particles resulting from the abrasion crashed the hard disk and/or gave rise to a disturbance of recording and/or regenerating. Furthermore, the method of forming a dry lubricating film (of a tetrafluoroethylene resin, an imide resin, etc.) on a contact area (or a sliding surface) of a ramp, and the like could not satisfactorily decrease abrasion loss at the resin portion of a ramp, said abrasion loss being generated when a hard disk drive was operated.

On the other hand, JP-2001-297548A discloses a ramp material having a tensile elongation of 30% or more based upon ASTM D638. This prior art discloses a polyacetal ramp, but discloses no polyacetal copolymer having a surface hardness as defined in the present invention and a particular shear stress. Besides, even if the above material having a tensile elongation of 30% or more based upon ASTM D638 is employed, a ramp with all the performance requirements that abrasion loss at the resin portion of a ramp is small (or abrasion loss after a durability test through reciprocating motions is small) when a hard disk drive is operated, and a resin portion small in dimensional change and excellent in moldabilities (with no molding sinks, no casting fins, and a short molding cycle) can not be obtained. Additionally, the sliding properties might be remarkably decreased depending upon molding conditions or the like, and the abrasion loss at the resin portion of the ramp might be increased when a hard disk is operated.

Furthermore, JP-2002-197820A discloses a material for a ramp, comprising a thermoplastic or thermosetting resin with an inorganic filler added in an amount of 4% by weight or less. This prior art discloses a ramp made of polyacetal, but discloses no polyacetal copolymer having a surface hardness as defined in the present invention, and a particular shear stress. Besides, even if such a material comprising a thermoplastic or thermosetting resin with an inorganic filler added in an amount of 4% by weight or less is employed, a ramp with all the performance requirements that abrasion loss at the resin portion of the ramp is small (or abrasion loss after a durability test through reciprocating motions is low) after a hard disk drive is operated, and a resin portion small in dimensional change and excellent in moldabilities (with no molding sinks, no casting fins, and a short molding cycle) could not be derived. Additionally, the sliding properties might be remarkably decreased depending upon molding conditions or the like, and the abrasion loss at the resin portion of the ramp might be increased after the hard disk drive is operated.

It is an object of the present invention to provide a ramp made of a polyacetal resin, which is excellent in moldabilities (with no molding sinks, no casting fins, and a short molding cycle), whose resin portion has a remarkably small abrasion loss after a hard disk drive is operated, which could not be derived in the prior art.

DISCLOSURE OF THE INVENTION

That is, the present invention relates to a ramp having a surface hardness of 2.6 GPa or more, which is derived by molding a polyacetal resin.

Furthermore, in particular, preferably as the polyacetal resin in the present invention, a polyacetal copolymer having a shear stress of $1 \times 10^6$ to $6 \times 10^6$ when determined at a shear rate of 10,000 (1/sec.) at a temperature of 210° C. is used.

BEST MODE FOR CARRYING OUT THE INVENTION

The constitution of the present invention will be detailed hereinafter.

A ramp of the present invention as obtained by molding a polyacetal resin has to have a surface hardness of 2.6 GPa or more. If the surface hardness is less than 2.6 GPa, the molded ramp may be easily worn after a hard disk drive is operated, whereby the product value may be decreased.

Furthermore, if a polyacetal resin having a shear stress of $1 \times 10^6$ to $1 \times 10^7$ when determined at a shear rate of 10,000 (1/sec.) at a temperature of 210° C. is used, a ramp having a high commercial value, which can be molded with no molding sinks, no casting fins, and a short molding cycle, can be efficiently and preferably produced. A polyacetal resin having a shear stress of $1 \times 10^6$ to $6 \times 10^6$ is in particular preferably used.

Examples of a polyacetal resin used in the present invention include, a polyoxymethylene homopolymer as obtained by the terminal stabilizing treatment of an oxymethylene homopolymer substantially comprising oxymethylene units, said oxymethylene homopolymer being produced by using as a raw material formic aldehyde monomer, or a cyclic oligomer such as a trimer (trioxane) or tetramer (tetraoxane) of formic aldehyde; and an oxymethylene copolymer as obtained by the terminal stabilizing treatment of an oxymethylene-oxyalkylene copolymer having oxyalkylene units of a carbon atom number of 2 to 8 in an amount of 0.1 to 20% by weight, said oxymethylene-oxyalkylene copolymer being produced by using the above-mentioned raw material, and a comonomer such as ethylene oxide, propylene oxide, epichlorohydrin, 1,3-dioxolane, 1,4-butanediol, a cyclic formal (for example, a glycol formal, or a diglycol formal).

Besides, a polyacetal resin used in the present invention may be an oxymethylene-oxyalcohol copolymer having a branched molecular chain structure; or an oxymethylene block copolymer comprising 50% by weight or more of polyoxymethylene (POM) blocks and 50% by weight or less of blocks of a polymer different from said POM. Incidentally, as the oxymethylene copolymer, an oxymethylene copolymer comprising an oxymethylene-oxyalkylene produced by using 1,3-dioxolane as a copolymer is preferred.

With respect to the application of a ramp of the present invention, from the viewpoint that the ramp is one of the parts used within a hard disk drive, a ramp having an excellent dimensional stability is required. Furthermore, since the ramp is a sliding part, a low wearing property is required therefor. When the low wearing property and the dimensional stability are considered, a copolymer having a comonomer in a small amount is preferred.

A method of preparing a polyacetal resin which can be used for the present invention is not particularly limited. It can be prepared according to a conventionally known method, for example, as described in U.S. Pat. No. 2,998,409 or the like. Specifically, in the case of a copolymer, it can be obtained by copolymerizing trioxane and a cyclic ether of a comonomer, and treating the obtained polymer with a biaxial extruder for terminal stabilization.

The polymerization is commonly carried out through bulk polymerization. The polymerization can be carried out by any one of batch and continuous type processes. As the batch polymerization apparatus, generally a reaction vessel with an agitator can be used. On the other hand, as the continuous polymerization apparatus, a co-kneader, a twin-screw type continuous extruding kneading machine, or a self cleaning type mixer such as a double paddle type continuous mixer can be used. The polymerization is carried out in a temperature range of 60° C. to 200° C. at normal pressures.

As a polymerization catalyst, boron trifluoride; hydrated boron trifluoride; or a coordination compound of boron trifluoride and an organic compound containing oxygen atom(s) or sulfur atom(s) is generally used in a gaseous form or a proper solution of an organic solvent. The resultant polymer contains an active polymerization catalyst, and thus the polymerization catalyst is desirably deactivated.

The deactivation of the polymerization catalyst can be carried out in an aqueous solution containing a basic material, or in an organic solvent. As another deactivation method, a method which comprises adding a basic material to a polyacetal resin before the terminal stabilization, and deactivating the catalyst in dissolved polyacetal with an extruder can also be used. As a basic material used for deactivation, a nitrogen compound such as a hindered amine, ammonia, triethylamine or tributylamine, or the like can be cited.

The terminal stabilizing treatment of the polymer after the deactivation of a polymerization catalyst can be carried out by removing volatile component(s) from a dissolved polyacetal resin, for example, with a twin-screw extruder which can continuously carry out an operation for the terminal stabilization, said operation comprising at least the two steps of: (1) injecting a basic material into a polymer in dissolved polyacetal, and kneading the same, and (2) releasing the above injected basic material vapor and liberated formaldehyde therefrom. As the above basic material, a nitrogen compound such as ammonia, triethylamine or tributylamine can be cited. Additionally, water may exist together with the basic material.

In the terminal stabilizing treatment, the heat treatment of unstable terminals after the polymerization is important. In this operation, a particular quaternary ammonium compound is suitably used as a catalyst. As a quaternary ammonium compound used for the present invention, one represented by the following general formula (1) is preferred:

$$[R^1R^2R^3R^4N^+]_n X^{n-} \quad (1)$$

wherein each of $R^1$, $R^2$, $R^3$ and $R^4$ independently represents an unsubstituted or substituted alkyl group having a carbon atom number of 1 to 30; an aryl group having a carbon atom number of 6 to 20; an aralkyl group wherein an unsubstituted or substituted alkyl group having a carbon atom number of 1 to 30 is substituted with at least one aryl group having a carbon atom number of 6 to 20; or an alkylaryl group wherein an aryl group having a carbon atom number of 6 to 20 is substituted with at least one unsubstituted or substituted alkyl group having a carbon atom number of 1 to 30, wherein the unsubstituted or substituted alkyl group is linear, branched, or cyclic, wherein a substituent group in the above substituted alkyl group is halogen, hydroxyl group, aldehyde group, carboxyl group, amino group, or amide group, wherein hydrogen atoms in the above unsubstituted alkyl group, aryl group, aralkyl group, or alkylaryl group may be substituted with halogen, wherein "n" represents an integer number of 1 to 3, and "X" represents a hydroxyl group, or an acid residue in a carboxylic acid having a carbon atom number of 1 to 20, a hydracid except hydrogen halides, an oxo acid, inorganic thio acid, or an organic thio acid having a carbon atom number of 1 to 20.

Among them, preferably each of $R^1$, $R^2$, $R^3$ and $R^4$ in the general formula (1) is independently an alkyl group having a carbon atom number of 1 to 5, or a hydroxyalkyl group having a carbon atom number of 2 to 4. Furthermore, in particular, preferably at least one of $R^1$, $R^2$, $R^3$ and $R^4$ is a hydroxyethyl group.

Examples of the quaternary ammonium compound include a hydroxide; a salt from a hydracid such as hydrochloric acid, hydrobromic acid, or hydrofluoric acid; a salt from an oxo acid such as sulfuric acid, nitric acid, phosphoric acid, carbonic acid, boric acid, chloric acid, iodic acid, silicic acid, perchloric acid, chlorous acid, hypochlorous acid, chlorosulfuric acid, amidesulfuric acid, disulfuric acid, or tripolyphosphoric acid; a salt from a thio acid such as thiosulfuric acid; or a salt from a carboxylic acid such as formic acid, acetic acid, propionic acid, butanoic acid, isobutyric acid, pentanoic acid, caproic acid, caprylic acid, capric acid, benzoic acid, or oxalic acid; specifically, for example, tetramethylammonium, tetraethylammonium, tetrapropylammonium, tetra-n-butylammonium, cetyltrimethylammonium, tetradecyltrimethylammonium, 1,6-hexamethlene-bis-(trimethylammonium), decamethylene-bis-(trimethylammonium), trimethyl-3-chloro-2-hydroxypropylammonium, trimethyl(2-hydroxyethyl) ammonium, triethyl(2-hydroxyethyl)ammonium, tripropyl(2-hydroxyethyl)ammonium, tri-n-butyl(2-hydroxyethyl) ammonium, trimethylbenzylammonium, triethylbenzylammonium, tripropylbenzylammonium, tri-n-butylbenzylammonium, trimethylphenylammonium, triethylphenylammonium, trimethyl-2-oxyethylammonium, monomethyltrihydroxyethylammonium, monoethyltrihydroxyethylammonium, octadecyltri(2-hydroxyethyl)ammonium, tetrakis(hydroxyethyl)ammonium.

Among others, preferably the quaternary ammonium compound is a salt from hydroxide ($OH^-$), sulfuric acid ($HSO_4^-$, or $SO_4^{2-}$), carbonic acid ($HCO_3^-$, or $CO_3^{2-}$), boric acid ($B(OH)_4^-$), or carboxylic acid. Furthermore, among carboxylic acids, formic acid, acetic acid, and propionic acid are particularly preferred.

Each of these quaternary ammonium compounds may be used alone or in combination. Furthermore, in addition to one or more of the quaternary ammonium compounds above, an amine such as ammonia or triethylamine, which is a conventionally known decomposition agent for an unstable terminal, may be used together.

The loads of a quaternary ammonium compound(s) to be added are preferably 0.05 to 50 ppm by weight in terms of the amount of nitrogen derived from the quaternary ammonium compound(s) relative to the total weight of a polyoxymethylene copolymer and the quaternary ammonium compound(s), which is represented by the following formula (2):

$$P \times 14/Q \quad (2)$$

wherein "P" represents the amount (ppm by weight) of the quaternary ammonium compound(s) based on the total weight of an oxymethylene copolymer and the quaternary ammonium compound(s); "14" represents the atomic weight of nitrogen; and "Q" represents the molecular weight of the quaternary ammonium compound(s).

When the loads of the quaternary ammonium compound(s) to be added are less than 0.05 ppm by weight, the decomposition rate of an unstable terminal is decreased, while when the loads are more than 50 ppm by weight, the color tone of a polyoxymethylene copolymer after the decomposition of an unstable terminal is deteriorated. Preferred heat treatment may be carried out using an extruder, a kneader or the like at a resin temperature from the melting point of the copolymer or more to 260° C. or less. When the temperature is more than 260° C., the problem of coloring, and the problem of the decomposition of a polymer backbone chain (or the lowering of the molecular weight) may occur. Formaldehyde generated by the decomposition can be removed under reduced pressure.

Methods of adding a quaternary ammonium compound(s) include, but are not limited to in particular, a method of adding the same in the form of an aqueous solution thereto at the step of deactivating a polymerization catalyst, and a method of spraying the same onto the copolymer powder. Any method of addition may be used, provided that the quaternary ammonium compound(s) has been added to the copolymer in the step of heat treating the copolymer. When the quaternary ammonium compound(s) is injected into an extruder, or a filler and/or a pigment are blended in the extruder or the like, the quaternary ammonium compound(s) may be sticked on pellets of the resin, followed by the decomposition of the unstable terminal in the subsequent process of blending. The decomposition of the unstable terminal may be carried out after the polymerization catalyst in the oxymethylene copolymer obtained by polymerization has been deactivated, or before the polymerization catalyst is deactivated.

As a method of deactivating a polymerization catalyst, typically a method of deactivating by neutralizing the polymerization catalyst in an aqueous basic solution of an amine or the like can be cited. Furthermore, the polymerization catalyst may be heated at the temperature of the melting point of an oxymethylene copolymer or less in an atmosphere of an inert gas without deactivating the polymerization catalyst, and be decreased by evaporation, followed by the decomposition of an unstable terminal of the present invention.

Figure 1:
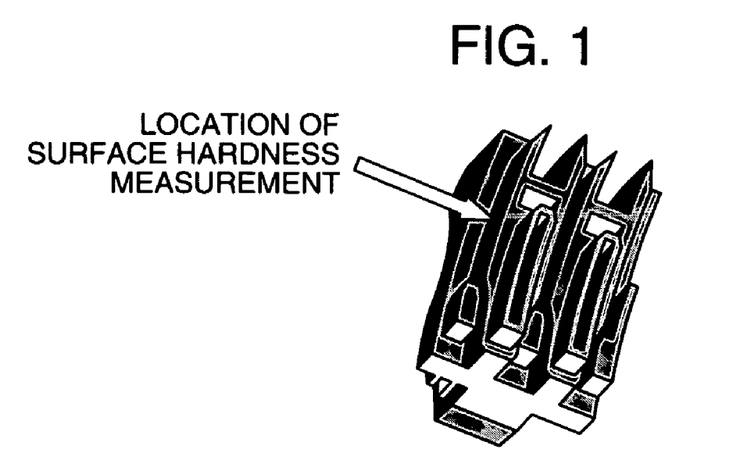
FIG. 1 is a schematic drawing illustrating one embodiment of the shape of a ramp of the present invention.

The wording "surface hardness" with respect to the present invention means the surface hardness at the near center section on the sliding surface of a ramp as shown in FIG. 1, which is determined by an apparatus being a combination of TRIBOSCOPE (Nanomechanical Test Instruments) (Hysitron Incorporated) and SPM 300HV (Seiko Instruments Inc.), while a ramp is used as a sample, said ramp being produced by molding a copolymer into a shape as shown in FIG. 1 under the conditions of a cylinder temperature of 200° C., an injection time of 20 seconds, and a cooling time of 10 seconds and using an injection molding machine having an injection capacity of 5 ounces. Herein, as an indenting tool, a diamond indenting tool in the form of a 90° triangular pyramid is used, which is calibrated by using a fused quartz 020822 as a standard material. Besides, the measurement should be carried out under the conditions of a maximum preset load of 100 μN, and a drawing and indentation time of 3 seconds, and the analysis conditions of Upper/Lower of 790/20, Area Function No. 8 should be selected. Incidentally, the details may depend upon the literature "Handbook of Micro/Nanotribology. (Mechanics and Materials Science), 2nd, ed. (1998), author or editor: Bhushan, B. (eds.), publisher: CRC Press LLC".

As mentioned above, in the application of a ramp, a small abrasion loss at the resin portion of the ramp is required. Abrasion particles dropped on a magnetic storage medium may crash a head, or deposit on the surface of the head, whereby recording and regeneration may be adversely affected, and by extension, the head may be rendered inoperative. Accordingly, in the present invention a polyacetal resin which is excellent in sliding properties is used in order to decrease the amount of abrasion particles. Furthermore, it has been found that the generation of abrasion particles depends upon the surface hardness of a ramp made from a polyacetal resin. That is, in order to decrease the amount of abrasion particles of a ramp within a hard disk drive, it is necessary that the surface hardness is 2.6 GPa or more. More preferably, the surface hardness is 2.7 GPa or more in order to decrease the amount of abrasion particles, and most preferably the surface hardness is 2.8 GPa or more. Incidentally, the upper bounding of the surface hardness is not limited in particular, although in order to avoid the elongation of the molding cycle of the ramp, for example, the upper bounding of the surface hardness is preferably set to 6.0 GPa, and more preferably to 4.0 GPa.

In order to enhance the surface hardness of a ramp, there exist some methods; a method of molding a ramp by enhancing the mold temperature, a method of molding a ramp by adding a nucleating agent to a polyacetal resin, a method of annealing the molded ramp, and the like can be cited.

First of all, the molding temperature at the time of molding to enhance the surface hardness of a ramp is preferably set to the range of 75 to 135° C. More preferred temperature range is 95 to 135° C., and most preferred temperature range is 110 to 135° C. When the molding temperature is 75° C. or more, a ramp having a certain surface hardness as required for low abrasion after a durability test can be obtained. Furthermore, when the molding temperature is 135° C. or less, a ramp can be molded with good productivity, without extremely elongating the molding cycle. If the molding temperature is up to approximately 120° C., a common water-temperature controlled mold can be used. If the molding temperature is 120° C. or more, it is necessary to use an apparatus such as a mold with a heater, or an oil-medium mold temperature controller, and/or to apply a heat insulating material to a mold.

Preferably the mold temperature is set to 75° C. or more for a polyacetal copolymer (whose melting point is 170±3° C.), 95° C. or more for a polyacetal copolymer (whose melting point is 165±3° C.), and 75° C. or more for a polyacetal homopolymer (whose melting point is 175±3° C.). In order to further enhance the surface hardness, more preferably the mold temperature is set to 80° C. or more for a polyacetal copolymer (whose melting point is 170±3° C.), 110° C. or more for a polyacetal copolymer (whose melting point is 165±3° C.), and 80° C. or more for a polyacetal homopolymer (whose melting point is 175±3° C.).

As a method of molding by adding a nucleating agent to a polyacetal resin, a method wherein boron nitride, talc, mica, alumina, a boric acid compound, or the like is previously molten and kneaded with a polyacetal resin so as to be homogeneously dispersed, followed by the injection molding of the resultant dispersion can be enumerated. Preferably, such a nucleating agent is blended in an amount of 0.01 to 0.1 part by weight per 100 parts by weight of the polyacetal resin.

As a method of annealing the molded ramp, a method wherein a molded ramp is heated at a temperature of 120 to 150° C. for about 30 to 180 minutes so as to anneal the polyacetal resin to promote the crystallization of the polyacetal resin can be cited.

Preferably, a polyacetal resin used in the present invention has a degree of crystallinity of 50% or more when determined according to a method as described hereinafter (in the Examples). This degree of crystallinity is more preferably 68% or more.

If the degree of crystallinity of a polyacetal resin is 50% or more, even when the molded ramp is used for a hard disk drive, the abrasion loss of the ramp is small, and thus a product having a high value tends to be obtained. That is, the surface hardness with respect to the present invention is related to the degree of crystallinity of a polyacetal resin to some extent. The higher that the degree of crystallinity is, the higher that the degree of crystallinity at the proximity of the surface is, and the higher the surface hardness is. Thus the degree of crystallinity of a polyacetal resin is one of the factors which remarkably influences the ramp performance of the present invention. However, speaking strictly with respect to the present invention, on further study, it has been found that the surface hardness of a ramp is more effective as a true parameter to decrease the abrasion loss of the resin portion of the ramp after a hard disk drive is operated, rather than the degree of crystallinity of the polyacetal resin.

The shear stress with respect to the present invention should be determined according to the following method.

The temperature is set to 210° C., and the shear rate of a polyacetal resin is changed in the range of 100 to 50,000 (1/sec.) using Capirograph (Toyo Seiki Seisaku-sho Ltd.) so that the dependency of the shear stress on the shear rate could be determined. As a sample of the polyacetal resin, pellets for injection molding, or ones cut to a pellet size should be used. As an orifice installed at the bottom of a barrel heated to 210° C., an orifice having a diameter of 0.5 mm and a length of 5.05 mm should be selected.

With respect to a ramp having a thin wall shape, it is preferred to mold by using a polyacetal resin having a shear stress of $1 \times 10^6$ to $1 \times 10^7$ when determined at a shear rate of 10,000 (1/sec) and at the temperature of 210° C. from the point of view of the molding sink, the degree of filling, and the surface appearance of a molded article. Furthermore, more preferably a polyacetal resin having a shear stress of $1 \times 10^6$ to $6 \times 10^6$ when determined at a shear rate of 10,000 (1/sec) and at the temperature of 210° C. is used. If a ramp is molded by using a polyacetal resin whose shear stress is deviated from this range, it is necessary to specially elevate the mold temperature, and/or the shape of a ramp to be molded is constrained, for example, a ramp having a thin wall shape can not be molded.

In the present invention, if necessary, a known pigment as commonly used for a polyacetal resin can be used as far as the object of the present invention is not counteracted. For example, an inorganic pigment comprising zinc sulfide, basic lead carbonate, basic lead sulfate, basic lead silicate, or metallic sulfide; or an azo, azomethine, methine, indanthrone, anthraquinone, pyranthrone, flavanthrone, benzenethrone, phthalocyanine, perinone, perylene, dioxazine, thioindigo, isoindoline, isoindolinone, quinacridone, pyrulepyrrole or quinophtharone system organic pigment; can be cited.

In the present invention, one of these pigments may be used, or two or more of them may be used together. In order to obtain a required color tone, two or more pigments should be used together generally.

The total amount of pigment(s) to be added is 0.005 to 5.0 parts by weight per 100 parts by weight of a polyacetal resin.

In the present invention, if necessary, known additive agents as commonly used for a polyacetal resin may be used as far as the object of the present application is not counteracted. Examples of the additive agent include an antioxidant, a scavenger agent for formaldehyde and/or formic acid, a light stabilizer, a mold releasing agent, a filler, and the like. The load of each of these additive agents is approximately 0.001 to 1 part by weight per 100 parts by weight of the polyacetal resin depending upon the sort of additive agent.

As the antioxidant, one or more of hindered phenol antioxidants can be used; specifically, for example, n-octadecyl-3-(3',5'-di-t-butyl-4'-hydroxyphenyl)-propionate, n-octadecyl-3-(3'-methyl-5'-t-butyl-4'-hydroxyphenyl)-propionate, n-tetradecyl-3-(3',5'-di-t-butyl-4'-hydroxyphenyl)-propionate, 1,6-hexanediol-bis-[3-(3,5-di-t-butyl-4-hydroxyphenyl)-propionate], 1,4-butanediol-bis-[3-(3,5-di-t-butyl-4-hydroxyphenyl)-propionate], triethyleneglycol-bis-[3-(3-t-butyl-5-methyl-4-hydroxyphenyl)-propionate], tetrakis [methylene-3-(3',5'-di-t-butyl-4'-hydroxyphenyl)propionate]methane, 3,9-bis[2-{3-(3-t-butyl-4-hydroxy-5-methylphenyl)propionyloxy}-1,1-dimethylethyl]2,4,8,10-tetraoxaspiro(5,5)undecane, N,N'-bis-3-(3',5'-di-t-butyl-4'-hydroxyphenyl)propionylhexamethylenediamine, N,N'-tetramethylene-bis-3-(3'-methyl-5'-t-butyl-4'-hydroxyphenyl)propionyldiamine, N,N'-bis-[3-(3,5-di-t-butyl-4-hydroxyphenyl)propionyl]hydrazine, N-salicyloyl-N'-salicylidenehydrazine, 3-(N-salicyloyl)amino-1,2,4-triazole, N,N'-bis[2-{3-(3,5-di-t-butyl-4-hydroxyphenyl)propionyloxy}ethyl]oxyamide, and the like can be cited. Triethylene glycol-bis-[3-(3-t-butyl-5-methyl-4-hydroxyphenyl)-propionate], and tetrakis [methylene-3-(3',5'-di-t-butyl-4'-hydroxyphenyl)propionate]methane are preferred.

Examples of the scavenger for formaldehyde and/or formic acid include (a) a compound or polymer containing a formaldehyde-reactive nitrogen, and (b) an alkali metal or alkaline earth metal hydroxide, mineral salt, carboxylate, and the like. As (a) the compound or polymer containing a formaldehyde-reactive nitrogen, a polyamide resin such as nylon 4-6, nylon 6, nylon 6-6, nylon 6-10, nylon 6-12, or nylon 12; and a copolymer thereof, such as nylon 6/6-6/6-10, or nylon 6/6-12 can be cited. In addition to them, acrylamide, and its derivatives, and a copolymer of acrylamide or a derivative thereof and another vinyl monomer can be cited; for example, a poly-β-alanine copolymer as obtained by polymerizing acrylamide or a derivative thereof and another vinyl monomer in the presence of a metal alcoholate can be cited. In addition to them, an amino-substituted triazine compound; an addition product of an amino-substituted triazine compound and formaldehyde; and a polycondensation product of an amino-substituted triazine compound and formaldehyde; can be cited.

Examples of the amino-substituted triazine compound include guanamine (2,4-diamino-sym-triazine), melamine (2,4,6-triamino-sym-triazine), N-butyl melamine, N-phenyl melamine, N,N'-diphenyl melamine, N,N'-diallyl melamine, N,N',N"-triphenyl melamine, benzoguanamine (2,4-diamino-6-phenyl-sym-triazine), 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine, 2-oxy-4,6-diamino-sym-triazine, and N,N',N"-tetracyanoethylbenzoguanamine.

Examples of the addition product of an amino-substituted triazine compound and formaldehyde include N-methylol melamine, N,N'-dimethylol melamine, and N,N',N"-trimethylol melamine.

As an example of the polycondensation product of an amino-substituted triazine compound and formaldehyde, a melamine-formaldehyde condensation product can be cited.

Each of these amino-substituted triazine compounds, addition products of an amino-substituted triazine compound and formaldehyde, and condensation products of an amino-substituted triazine compound and formaldehyde may be used alone or in combination.

As (b) the alkali-metal or alkaline-earth-metal hydroxide, mineral salt, or carboxylate, for example, a hydroxide of sodium, potassium, magnesium, calcium or barium; a carbonate, phosphate, silicate or carboxylate of any one of the above metals; can be cited. Specifically, calcium salts such as calcium hydroxide, calcium carbonate, calcium phosphate, calcium silicate, calcium borate, and a calcium salt of a fatty acid (such as calcium stearate, or calcium myristate) are preferred. These fatty acids may be substituted with a hydroxyl group. Among them, a calcium salt of a fatty acid (such as calcium stearate, or calcium myristate) is preferred. Each of these scavengers for formaldehyde and/or formic acid may be used alone or in combination.

As the light stabilizer, for example, one or more of a benzotriazole ultraviolet absorber, an oxalic anilide ultraviolet absorber, and a hindered amine light stabilizer can be cited. Examples of the benzotriazole ultraviolet absorber include 2-(2'-hydroxy-5'-methyl-phenyl)benzotriazole, 2-(2'-hydroxy-3',5'-di-t-butyl-phenyl)benzotriazole, 2-(2'-hydroxy-3',5'-di-isoamyl-phenyl)benzotriazole, 2-[2'-hydroxy-3',5'-bis-(α,α-dimethylbenzyl)phenyl]-2H-benzotriazole, and 2-(2'-hydroxy-4'-octoxyphenyl)benzotriazole. Examples of the oxalic anilide ultraviolet absorber include 2-ethoxy-2'-ethyloxalic acid bisanilide, 2-ethoxy-5-t-butyl-2'-ethyloxalic acid bisanilide, and 2-ethoxy-3'-dodecyl oxalic acid bisanilide. Each of these ultraviolet absorbers may be used alone or in combination.

Furthermore, examples of the hindered amine light-stabilizer include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl)-carbonate, bis(2,2,6,6-tetramethyl-4-piperidyl)-oxalate, bis(2,2,6,6-tetramethyl-4-piperidyl)-malonate, bis(2,2,6,6-tetramethyl-4-piperidyl)-sebacate, bis(2,2,6,6-tetramethyl-4-piperidyl)-adipate, bis(2,2,6,6-tetramethyl-4-piperidyl)-terephthalate, 1,2-bis(2,2,6,6-tetramethyl-4-piperidyloxy)-ethane, α,α'-bis(2,2,6,6-tetramethyl-4-piperidyloxy)-p-xylene, bis(2,2,6,6-tetramethyl-4-piperidyltolylene-2,4-dicarbamate, bis(2,2,6,6-tetramethyl-4-piperidyl)-hexamethylene-1,6-dicarbamate, tris(2,2,6,6-tetramethyl-4-piperidyl)-benzene-1,3,5-tricarboxylate, tris(2,2,6,6-tetramethyl-4-piperidyl)-benzene-1,3,4-tricarboxylate, 1-[2-{3-(3,5-di-t-butyl-4-hydroxyphenyl)propionyloxy}butyl]-4-[3-(3,5-di-t-butyl-4-hydroxyphenyl)propionyloxy]2,2,6,6-tetramethylpiperidine, and a condensation product of 1,2,3,4-butanetetracarboxylic acid and 1,2,2,6,6-pentamethyl-4-piperidinol and β,β,β',β'-tetramethyl-3,9-[2,4,8,10-tetraoxaspiro[5.5]undecane]diethanol. Each of the above mentioned hindered amine light stabilizers may be used alone or in combination. Furthermore, they may be used in combination with the above mentioned benzotriazole ultraviolet absorber and/or oxalic anilide ultraviolet absorber.

As the mold releasing agent, for example, one or more selected from polyalkylene glycols, and aliphatic compounds having amide groups can be cited.

As the polyalkylene glycol, a polyalkylene glycol as represented by the following general formula (3) can be used:

(3)

wherein $R^5$ is selected from the group consisting of hydrogen, an alkyl group having 1 to 6 carbon atoms, a substituted alkyl group, and a substituted allyl group, which may be identical with each other, or different from each other; X represents a number of 2 to 6; and Y represents a number of 1000 to 20000.

The polyalkylene glycol can be obtained by the ring opening polymerization of an alkylene oxide. Examples of the alkylene oxide include ethylene oxide, propylene oxide, butylene oxide, epichlorohydrin, styrene oxide, oxetane, 3,3-bis(chloromethyl)oxetane, tetrahydrofuran, 2-methyltetrahydrofuran, and oxepane. Each of these polyalkylene glycols may be used alone or in combination.

As the aliphatic compound having amide groups, an aliphatic compound as represented by the following general formula (4) can be used:

(4)

wherein each of $R^6$ and $R^8$ is an alkyl group having 9 to 35 carbon atoms, which may be identical with each other, or different from each other; and $R^7$ represents an alkylene group having 1 to 6 carbon atoms.

Examples of the aliphatic compound having amide groups include ethylenebispalmitic acid amide, ethylenebisstearic acid amide, ethylenebislauric acid amide, ethylenebisoleic acid amide, ethylenebiserucic acid amide, ethylene (monopalmitic acid-monostearic acid)amide, ethylene (monostearic acid-monoheptadecylic acid)amide, and the like. Each of these aliphatic compounds having amide groups may be used alone or in combination.

As the filler, various reinforcing agents such as glass fibers, glass beads, glass balloons, wollastonite, carbon fibers, talc, mica, and titanium whisker; and a nucleating agent as typified by boron nitride; can be cited.

A method of adding the above additive agent(s) to a polyacetal resin is not limited in particular. A polyacetal resin according to the present invention can be generally produced by melting and kneading the polyacetal resin and additive agent(s) which is an optional component(s) as defined herein, by means of an extruder. In this case, preferably, the additive agents may be premixed before melting and kneading with a polyacetal resin; or the additive agent(s) and the polyacetal resin may be premixed before melting and kneading the same. The method of premixing them is not limited in particular, for which any known technique can be properly selected. The extruder to be used may be a monoaxial or biaxial type. Besides, when the polyacetal resin is polymerized, the additive agent(s) may be added thereto. Generally the temperature of the extruder may be properly selected from the range of 170° C. to 240° C., but is not limited thereto.

A method of molding a ramp of the present invention is not limited in particular. The ramp can be molded by any one of the known molding methods such as extrusion molding, injection molding, compression molding, vacuum molding, blow molding, expansion molding, gas injection, insert molding, outsert molding, etc. Among others, injection molding or compression molding is preferred from the viewpoint of production efficiency, the amount of dimensional change, and the like.

EXAMPLES

The present invention will be detailed hereinafter through working examples and comparative examples, but the present invention is not intended to be limited to these examples.

Example 1

A twin-screw paddle type continuous polymerization apparatus with a jacket capable of passing a heat medium was adjusted to a temperature of 80° C. Then, trioxane (12 kg/hr.); 1,3-dioxolane (148 g/hr.; 0.015 mole per 1 mole of trioxane) containing 100 ppm of acetaldehyde, as a comonomer; methylal (23.3 g/hr.; and $2.3 \times 10^{-3}$ mole per 1 mole of trioxane) as a molecular weight modifier were continuously added thereto. Furthermore, a solution of 1% by weight of boron trifluoride-di-n-butyl etherate in cyclohexane (39.6 g/hr.) as a polymerization catalyst was continuously added thereto so as to provide $1.5 \times 10^{-5}$ mole of boron trifluoride per 1 mole of trioxane for polymerization.

The polyoxymethylene copolymer discharged from the mixer was injected into a 0.1% aqueous solution of triethylamine so as to deactivate the polymerization catalyst. The deactivated polyoxymethylene copolymer was filtered through a centrifugal separator, and then 1 part by weight of an aqueous solution containing a formate of choline hydroxide (trimethyl-2-hydroxyethylammonium formate) as a quaternary ammonium compound was added to 100 parts by weight of the polyoxymethylene copolymer after filtration, and the mixture was homogeneously mixed, followed by drying at a temperature of 120° C. The load of the formate of choline hydroxide to be added was 20 ppm in terms of the amount of nitrogen. The adjustment of the load of the formate of choline hydroxide to be added was carried out by adjusting the concentration of the formate of choline hydroxide in the aqueous solution containing the formate of choline hydroxide. 0.3 part by weight of triethylene glycol-bis-[3-(3-t-butyl-5-methyl-4-hydroxyphenyl)-propionate] as an antioxidant per 100 parts by weight of the polyoxymethylene copolymer after drying was added to the polyoxymethylene copolymer, followed by the supply to a twin-screw type extruder with a vent.

0.5 part by weight of water was added to 100 parts by weight of the polyoxymethylene copolymer molten in the extruder, and the unstable terminal was decomposed at an extruder preset temperature of 200° C., for a period of retention time of 5 minutes in the extruder. The decomposed polyoxymethylene copolymer at the unstable terminal was evaporated under conditions of a degree of vacuum of 20 torr at a vent, and extruded as a strand from the dies portion of the extruder, and pelletized. 100 parts by weight of these pellets were mixed with 0.1 part by weight of calcium distearate, 0.05 part by weight of calcium dipalmitate, 0.05 part by weight of nylon 66, 0.025 part by weight of ethylene glycol distearate, and 0.005 part by weight of ethylene glycol dipalmitate, followed by melt kneading with a single-axis extruder with a vent so as to form the final polyoxymethylene copolymer pellets.

According to the following measuring methods, the shear stress, the surface hardness, the degree of crystallinity, the moldabilities (upon molding sinks, molding fins, and molding cycle), the amount of dimensional change, the abrasion loss after a durability test, of the obtained polyoxymethylene copolymer were determined. The results are shown in Table 1.

<Shear Stress>

The temperature was set to 210° C., and the shear rate of a polyacetal resin was changed from 100 to 50,000 (1/sec.) using a Capirograph (Toyo Seiki Seisaku-sho Ltd.) so that the dependency of the shear stress on the shear rate could be determined. As an orifice installed to the bottom of the barrel heated to a temperature of 210° C., an orifice having a diameter of 0.5 mm and a length of 5.05 mm was selected.

<Surface Hardness>

Using an injection molding machine with an injection capacity of 5 ounces wherein the cylinder temperature was set to 200° C. and the mold temperature was set to 80° C., a ramp having a shape as shown in FIG. 1 was molded under the conditions of an injection time of 20 seconds and a cooling time of 10 seconds. Using the obtained ramp as a sample, the surface hardness of the approximately central section of the sliding surface of the ramp as shown in FIG. 1 was determined by using an apparatus which is a combination of TRIBOSCOPE (Nanomechanical Test Instruments) (Hysitron Incorporated) and SPM 300 HV (Seiko Instruments Inc.). As an indenting tool, a diamond indenting tool in the form of a 90° triangular pyramid was used, which was calibrated by using a fused quartz 020822 as a standard material. Besides, the measurement conditions of a maximum preset load of 100 μN, and a drawing and indentation time of 3 seconds were used, and the analysis conditions of Upper/Lower of 79/20, Area Function No. 8 were selected. Incidentally, the details depended upon the literature "Handbook of Micro/Nanotribology (Mechanics and Materials Science), 2nd, ed. (1998), author and editor: Bhushan, B. (eds.), publisher: CRC Press LLC".

<Degree of Crystallinity>

Using an injection molding machine with an injection capacity of 5 ounces wherein the cylinder temperature was set to 200° C. and the mold temperature was set to 80° C., a flat plate of 60×60×3 (mm) was molded from the obtained polyacetal resin under the conditions of an injection time of 20 seconds and a cooling time of 10 seconds. The formed flat plate mold specimen as a sample was scanned over the angle range of diffraction (2θ) of 10 to 30° through a goniometer at a tube voltage of 50 KV at a tube current of 120 mA using an X-ray diffractometer (Rigaku Industrial Corporation) according to a reflection method. A used slit of 1/2° was selected.

<Moldabilities>

Using an injection molding machine with an injection capacity of 5 ounces wherein the cylinder temperature was set to 200° C. and a ramp having a shape as shown in FIG. 1 was molded under the conditions of an injection time of 20 seconds and a cooling time of 10 seconds, followed by the visual observation of molding sinks and casting fins on the resultant molded article. The judgement was carried out according to the following criteria.

When no molding sinks and no casting fins were observed: ○

When a small amount of molding sinks and/or a small amount of casting fins were observed: Δ

When some molding sinks and/or some casting fins were observed: X

<Molding Cycle>

When using an injection molding machine with an injection capacity of 5 ounces wherein the cylinder temperature was set to 200° C., a ramp having a shape as shown in FIG. 1 was molded, the gate seal time was determined, and furthermore the time when the resin had been sufficiently cooled and had been able to be protruded with an ejecting pin was determined. The wording "gate seal time" means the time when a gate is sealed at the time of injection, and even if a dwell pressure application was applied thereto for a further period of time, no further resin was injected into the cavity. In order to determine a gate seal time, the pressure dwell should be gradually elongated from a short period of time, and then a state in which the weight of a molded ramp article is increased should be observed, and the time when the increase of the weight has been stopped and the weight has been constant should be taken as the "gate seal time". Additionally, the cooling time until a time when the article had been sufficiently cooled and had been able to be protruded with an ejecting pin is added. The total time of such a gate seal time, cooling time, and time required for opening and closing of a mold tool is referred to as "molding cycle" herein.

<Amount of Dimensional Change>

Using an SG-50 type injection molding machine (Sumitomo Heavy Industries, Ltd.) wherein the cylinder temperature was set to 195° C., the mold temperature was set to 80° C., and an injection/cool time was set to 10 sec./15 sec., a φ60 spur gear (m=1, b=5, and z=60) was molded with a mold having the dimension of φ63.24 mm. The resultant molded article was stored in a room with constant temperature and humidity (23° C., 50% Rh) from immediately after molding. The amount of dimensional change of the tip diameter (of about φ62) after 14 days therefrom was measured by a micrometer caliper on the basis of a dimension (as zero) measured after 24 hours from molding.

<Abrasion Loss After Durability Test>

Figure 2:
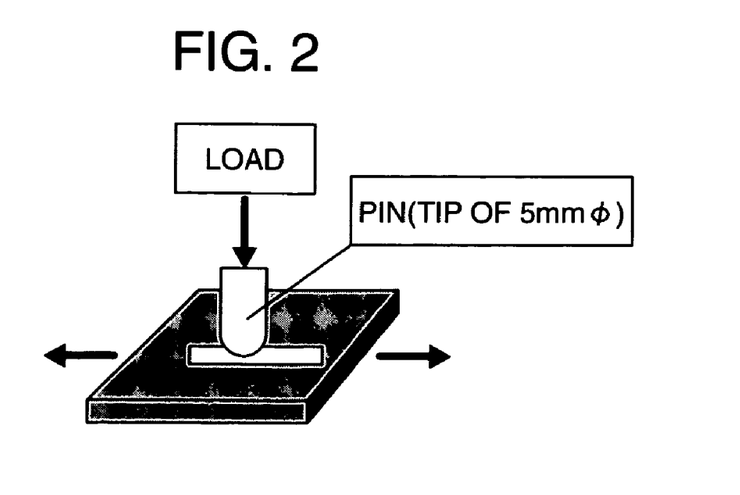
FIG. 2 is a schematic drawing of a device used for a durability test in the present invention.

Using an injection molding machine with an injection capacity of 5 ounces wherein the cylinder temperature was set to 200° C., a flat plate having a thickness of 2 (mm) was molded under the conditions of an injection time of 20 seconds and cooling time of 15 seconds. The resultant molded article was reciprocated fifty thousand times under the conditions of a load of 100 g, a linear velocity of 100 mm/sec, a reciprocating length of 20 mm, and an environmental temperature of 23° C. by using a reciprocating friction wear testing machine (AFT-15MS type of TOYO SEIMITSU K.K.), followed by the determination of an abrasion loss after the durability test (see FIG. 2). As a mating material, an SUS304 test piece (a sphere having a diameter of 5 mm) corresponding to a material used for a tab was used. Incidentally, although in an actual circumstance the stress applied to a ramp is about 3 to 5 g with a reciprocating time of about five hundred thousand times, a higher load was used with a smaller reciprocating time for shortening the evaluation period of time, and for enhancing the efficiency in this test.

Examples 2 to 4

Using pellets of a polyoxymethylene copolymer similar to the one used in Example 1, the shear stress, the surface hardness, the moldabilities, the amount of dimensional change, and the abrasion loss after a durability test were determined in a similar manner to the one in Example 1, except that the mold temperature was changed to 100° C., 120° C. and 130° C. The results are shown in Table 1.

Example 5

Pellets of a polyoxymethylene copolymer were produced in a similar manner to the one in Example 1, except that the amounts of 1,3-dioxolane and methylal per 1 mole of trioxane were changed to 0.015 mole and $1.0 \times 10^{-3}$ mole, respectively. Furthermore, in a similar manner to the one in Example 1, the shear stress, the surface hardness, the degree of crystallinity, the moldabilities, the amount of dimensional change, and the abrasion loss after a durability test were determined. The results are shown in Table 1.

Example 6

In a similar manner to the one in Example 1, except that a polyoxymethylene homopolymer (Tenac 7010 of ASAHI KASEI CHEMICALS CORPORATION) in place of the polyoxymethylene copolymer was employed, the shear stress, the surface hardness, the degree of crystallinity, the moldabilities, the amount of dimensional change, and the abrasion loss after a durability test were determined. The results are shown in Table 1.

Example 7

In a similar manner to the one in Example 1, except that a polyoxymethylene homopolymer (Tenac 4010 of ASAHI KASEI CHEMICALS CORPORATION) in place of the polyoxymethylene copolymer was employed and the mold temperature was set to 120° C., the shear stress, the surface hardness, the moldabilities, the amount of dimensional change, and the abrasion loss after a durability test were determined. The results are shown in Table 1.

Example 8

In a similar manner to the one in Example 1, except that a polyoxymethylene homopolymer (Tenac 4010 of ASAHI KASEI CORPORATION) in place of the polyoxymethylene copolymer was employed and the mold temperature was set to 130° C., the shear stress, the surface hardness, the moldabilities, the amount of dimensional change, and the abrasion loss after a durability test were determined. The results are shown in Table 1.

Examples 9 and 10

Pellets of a polyoxymethylene copolymer were produced in a similar manner to the one in Example 1, except that the amounts of 1,3-dioxolane and methylal per 1 mole of trioxane were changed to 0.038 mole and $2.3 \times 10^{-3}$ mole, respectively. Furthermore, in a similar manner to the one in Example 1, except that the mold temperature was changed to 120° C. and 150° C., the shear stress, the surface hardness, the moldabilities, the amount of dimensional change, and the abrasion loss after a durability test were determined. The results are shown in Table 1.

Example 11

Pellets of a polyoxymethylene copolymer were produced in a similar manner to the one in Example 1, except that the amounts of 1,3-dioxolane and methylal per 1 mole of trioxane were changed to 0.015 mole and $0.8 \times 10^{-3}$ mole, respectively. Furthermore, in a similar manner to the one in Example 1, except that the mold temperature was changed to 100° C., the shear stress, the surface hardness, the moldabilities, the amount of dimensional change, and the abrasion loss after a durability test were determined. The results are shown in Table 1.

Example 12

In a similar manner to the one in Example 1, except that a polyoxymethylene homopolymer (Tenac 3010 of ASAHI KASEI CHEMICALS CORPORATION) in place of the polyoxymethylene copolymer was employed and the mold temperature was set to 120° C., the shear stress, the surface hardness, the moldabilities, the amount of dimensional change, and the abrasion loss after a durability test were determined. The results are shown in Table 1.

Example 13

Pellets of a polyoxymethylene copolymer were produced in a similar manner to the one in Example 1, except that the amounts of 1,3-dioxolane and methylal per 1 mole of trioxane were changed to 0.038 mole and $0.8 \times 10^{-3}$ mole, respectively. Furthermore, in a similar manner to the one in Example 1, except that the mold temperature was changed to 120° C., the shear stress, the surface hardness, the moldabilities, the amount of dimensional change, and the abrasion loss after a durability test were determined. The results are shown in Table 1.

Comparative Example 1

Using pellets of a polyoxymethylene copolymer similar to the one used in Example 1, the shear stress, the surface hardness, the moldabilities, the amount of dimensional change, and the abrasion loss after a durability test were determined in a similar manner to the one in Example 1, except that the mold temperature was changed to 40° C. The results are shown in Table 1.

Comparative Example 2

Pellets of a polyoxymethylene copolymer were produced in a similar manner to the one in Example 1, except that the amounts of 1,3-dioxolane and methylal per 1 mole of trioxane were changed to 0.12 mole and $2.3\times10^{-3}$ mole, respectively. Furthermore, in a similar manner to the one in Example 1, except that the mold temperature was changed to 120° C., the shear stress, the surface hardness, the moldabilities, the amount of dimensional change, and the abrasion loss after a durability test were determined. The results are shown in Table 1.

Comparative Example 3

Pellets of a polyoxymethylene copolymer were produced in a similar manner to the one in Example 1, except that the amounts of 1,3-dioxolane and methylal per 1 mole of trioxane were changed to 0.12 mole and $1.0\times10^{-3}$ mole, respectively. Furthermore, in a similar manner to the one in Example 1, except that the mold temperature was changed to 120° C., the shear stress, the surface hardness, the moldabilities, the amount of dimensional change, and the abrasion loss after a durability test were determined. The results are shown in Table 1.

Comparative Example 4

Pellets of a polyoxymethylene copolymer were produced in a similar manner to the one in Example 1, except that the amounts of 1,3-dioxolane and methylal per 1 mole of trioxane were changed to 0.038 mole and $1.0\times10^{-3}$ mole, respectively. Furthermore, in a similar manner to the one in Example 1, the shear stress, the surface hardness, the degree of crystallinity, the moldabilities, the amount of dimensional change, and the abrasion loss after a durability test were determined. The results are shown in Table 1.

From the above mentioned Examples and Comparative Examples, it is apparent that a ramp made of a polyacetal resin having a surface hardness of 2.6 GPa or more is excellent in moldabilities (with no molding sinks, no casting fins, and a shorter molding cycle), and the abrasion loss of the resin portion of the ramp after a hard disk drive is operated is remarkably small (that is, the abrasion loss of a flat plate after a durability test is small).

INDUSTRIAL APPLICABILITY

A ramp mode of a polyacetal resin in accordance with the present invention is excellent in moldabilities (with no molding sinks, no casting fins, and a short mold cycling), and the abrasion loss at the resin portion thereof is remarkably small after a hard disk drive is operated. Accordingly, the ramp of the present invention can be used as a ramp for housing and guiding a head within a hard disk drive in any hard disk products and hard disk-like products.

The invention claimed is:

1. A ramp which has a surface hardness of 2.6 GPa or more, and
    which is obtained by molding a polyacetal resin, said polyacetal resin being selected from the group consisting of an oxymethylene homopolymer as obtained by the terminal stabilizing treatment of an oxymethylene homopolymer substantially comprising oxymethylene units, said oxymethylene homopolymer being produced by using as a raw material formic aldehyde monomer, or a cyclic oligomer; an oxymethylene copolymer as obtained by the terminal stabilizing treatment of an oxymethylene copolymer produced by using the above-mentioned raw material and a comonomer; an oxymethylene-oxyalcohol copolymer having a branched molecular chain structure; and an oxymethylene block copolymer comprising 50% by weight or more of polyoxymethylene (POM) blocks and 50% by weight or less of blocks of a polymer different from said POM.

2. A ramp according to claim 1, wherein the polyacetal resin is a polyacetal copolymer.

3. A ramp according to claim 1, having a shear stress of $1\times10^6$ to $1\times10^7$ when determined at a shear rate of 10,000 (1/sec.) at a temperature of 210° C.

4. A ramp according to claim 2, having a shear stress of $1\times10^6$ to $1\times10^7$ when determined at a shear rate of 10,000 (1/sec.) at a temperature of 210° C.

5. A ramp according to claim 1, having a shear stress of $1\times10^6$ to $6\times10^6$ when determined at a shear rate of 10,000 (1/sec.) at a temperature of 210° C.

6. A ramp according to claim 2, having a shear stress of $1\times10^6$ to $6\times10^6$ when determined at a shear rate of 10,000 (1/sec.) at a temperature of 210° C.

TABLE 1

|  | Stress Shear (dyn/cm²) | Temp. Mold (° C.) | Surface Hardness (GPa) | Degree of Crystallinity (%) | Molding Sinks | Casting Fins | Molding Cycle (sec.) | Abrasion Loss after Durability Test (μm) | Amount of Dimensional Change (μm) |
|---|---|---|---|---|---|---|---|---|---|
| Example 1 | $5\times10^6$ | 80 | 2.8 | 70 | ○ | ○ | 28 | 6 | 23 |
| Example 2 | $5\times10^6$ | 100 | 3.0 | — | ○ | ○ | 29 | 5 | 12 |
| Example 3 | $5\times10^6$ | 120 | 3.1 | — | ○ | ○ | 30 | 4 | 2 |
| Example 4 | $5\times10^6$ | 130 | 3.1 | — | ○ | ○ | 31 | 4 | 2 |
| Example 5 | $6.8\times10^6$ | 80 | 2.7 | 70 | Δ | ○ | 28 | 10 | 25 |
| Example 6 | $5\times10^6$ | 80 | 2.8 | 75 | ○ | ○ | 27 | 7 | 50 |
| Example 7 | $7\times10^6$ | 120 | 3.1 | — | Δ | ○ | 28 | 5 | 31 |
| Example 8 | $7\times10^6$ | 130 | 3.1 | — | Δ | ○ | 29 | 4 | 30 |
| Example 9 | $6.6\times10^6$ | 120 | 2.7 | — | ○ | ○ | 30 | 12 | 2 |
| Example 10 | $6.6\times10^6$ | 150 | 2.9 | — | ○ | Δ | 150 | 7 | 1 |
| Example 11 | $9.8\times10^6$ | 100 | 2.9 | — | Δ | ○ | 30 | 6 | 15 |
| Example 12 | $8.8\times10^6$ | 120 | 3.0 | — | Δ | ○ | 29 | 5 | 39 |
| Example 13 | $9.0\times10^6$ | 120 | 2.7 | — | Δ | ○ | 32 | 14 | 4 |
| Comp. Ex. 1 | $5\times10^6$ | 40 | 2.5 | — | ○ | ○ | 20 | 18 | 32 |
| Comp. Ex. 2 | $5\times10^6$ | 120 | 2.1 | — | ○ | X | 43 | 69 | 42 |
| Comp. Ex. 3 | $6.8\times10^6$ | 120 | 2.3 | — | ○ | X | 40 | 53 | 39 |
| Comp. Ex. 4 | $6.8\times10^6$ | 80 | 2.4 | 66 | ○ | ○ | 29 | 44 | 7 |

7. A a ramp according to claim 2, wherein the ramp is obtained by molding at a mold temperature of 75 to 135° C.

8. A a ramp according to claim 4, wherein the ramp is obtained by molding at a mold temperature of 75 to 135° C.

9. A a ramp according to claim 6, wherein the ramp is obtained by molding at a mold temperature of 75 to 135° C.

10. A ramp according to claim 1, wherein the ramp has a surface hardness of 2.8 GPa or more.

11. A ramp according to claim 2, wherein the ramp has a surface hardness of 2.8 GPa or more.

12. A ramp according to claim 6, wherein the ramp has a surface hardness of 2.8 GPa or more.

13. A method according to claim 9, wherein the ramp has a surface hardness of 2.8 GPa or more.

14. A ramp according to claim 1, wherein the cyclic oligomer is trioxane or tetraoxane.

15. A ramp according to claim 1, wherein the comononer is selected from the group consisting of ethylene oxide, propylene oxide, epichlorohydrin, 1,3-dioxolane, 1,4-butanediol and a cyclic formal.

16. A ramp according to claim 15, wherein the cyclic formal is a glycol formal or a diglycol formal.

* * * * *